(12) United States Patent
Dhong et al.

(10) Patent No.: US 6,282,557 B1
(45) Date of Patent: Aug. 28, 2001

(54) LOW LATENCY FUSED MULTIPLY-ADDER

(75) Inventors: Sang Hoo Dhong; Hung Cai Ngo, both of Austin; Kevin John Nowka, Round Rock, all of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/207,483

(22) Filed: Dec. 8, 1998

(51) Int. Cl.[7] .................................................. G06F 7/48
(52) U.S. Cl. ........................................... 708/523; 708/501
(58) Field of Search ...................................... 708/523, 501

(56) References Cited

U.S. PATENT DOCUMENTS

| | | | | |
|---|---|---|---|---|
| 3,761,698 | * | 9/1973 | Stephenson | 708/523 |
| 4,594,678 | * | 6/1986 | Uhlenhoff | 708/523 |
| 4,852,037 | * | 7/1989 | Aoki | 708/523 |
| 4,969,118 | * | 11/1990 | Montoye et al. | 708/523 |
| 5,751,619 | * | 5/1998 | Agarwal et al. | 708/523 |

* cited by examiner

*Primary Examiner*—David H. Malzahn
(74) *Attorney, Agent, or Firm*—Casimer K. Salys; Bracewell & Patterson, L.L.P.

(57) ABSTRACT

A low latency fused multiply-adder for adding a product of a first binary number and a second binary number to a third binary number is disclosed. The low latency fused multiply-adder includes a partial product generation module, a partial product reduction module, and a carry propagate adder. The partial product generation module generates a set of partial products from the first binary number and the second binary number. Coupled to the partial product generation module, the partial product reduction module combines the set of partial products with the third binary number to produce a redundant Sum and a redundant Carry. Finally, the carry propagate adder adds the redundant Sum and the redundant Carry to yield a Sum Total.

15 Claims, 5 Drawing Sheets

$$
\begin{array}{rrrrrr}
 & c_4 & c_3 & c_2 & c_1 & c_0 \\
\times & a_4 & a_3 & a_2 & a_1 & a_0 \\
\hline
 & a_0c_4 & a_0c_3 & a_0c_2 & a_0c_1 & a_0c_0 \\
 & a_1c_4 & a_1c_3 & a_1c_2 & a_1c_1 & a_1c_0 \\
 & a_2c_4 & a_2c_3 & a_2c_2 & a_2c_1 & a_2c_0 \\
 & a_3c_4 & a_3c_3 & a_3c_2 & a_3c_1 & a_3c_0 \\
a_4c_4 & a_4c_3 & a_4c_2 & a_4c_1 & a_4c_0 & \\
\end{array}
$$

*Fig. 4a*

$$
\begin{array}{rrrrrr}
 & \overline{a_0c_4} & a_0c_3 & a_0c_2 & a_0c_1 & a_0c_0 \\
 & \overline{a_1c_4} & a_1c_3 & a_1c_2 & a_1c_1 & a_1c_0 \\
 & \overline{a_2c_4} & a_2c_3 & a_2c_2 & a_2c_1 & a_2c_0 \\
 & \overline{a_3c_4} & a_3c_3 & a_3c_2 & a_3c_1 & a_3c_0 \\
\overline{a_4c_4} & a_4c_3 & a_4c_2 & a_4c_1 & a_4c_0 & \\
\end{array}
$$

*Fig. 4b*

$$
\begin{array}{rrrrrrr}
 & \overline{a_0c_4} & a_0c_3 & a_0c_2 & a_0c_1 & a_0c_0 & \\
 & \overline{a_1c_4} & a_1c_3 & a_1c_2 & a_1c_1 & a_1c_0 & \\
 & \overline{a_2c_4} & a_2c_3 & a_2c_2 & a_2c_1 & a_2c_0 & \\
 & \overline{a_3c_4} & a_3c_3 & a_3c_2 & a_3c_1 & a_3c_0 & \\
\overline{a_4c_4} & a_4c_3 & a_4c_2 & a_4c_1 & a_4c_0 & & b_4 \\
 & \overline{b_4} & b_3 & b_2 & b_1 & b_0 & \\
\end{array}
$$

*Fig. 4c*

LOW LATENCY FUSED MULTIPLY-ADDER

BACKGROUND OF THE INVENTION

1. Technical Field

The present invention relates to an apparatus for data processing in general, and in particular to an apparatus for performing both multiplication and addition. Still more particularly, the present invention relates to a low latency fused multiply-adder.

2. Description of the Prior Art

Fused multiply-adders combine a multiplication operation with an add operation. Within a fused multiply-adder, a multiplicand and a multiplier are initially multiplied via a partial product generation module. The partial products are then added by a partial product reduction module that reduces the partial products to a Sum and a Carry in their redundant form. The redundant Sum and Carry are further added to an addend via a carry-save adder to form another redundant Sum and Carry. The second redundant Sum and the second redundant Carry are subsequently added within a carry-propagate adder to yield a Sum Total.

While a prior art multiply-add operation performed by a fused multiply-adder typically has a lower latency than the combined latencies of individual multiplication operation and addition operations, the present invention recognizes that the configuration of a prior art fused multiply-adder contributes to an increase in the latency of multiplication operations. Consequently, it would be desirable to provide an improved fused multiply-adder with a low latency multiplication operation.

SUMMARY OF THE INVENTION

In accordance with a preferred embodiment of the present invention, a fused multiply-adder for adding a product of a first binary number and a second binary number to a third binary number includes a partial product generation module, a partial product reduction module, and a carry propagate adder. The partial product generation module generates a set of partial products from the first binary number and the second binary number. Coupled to the partial product generation module, the partial product reduction module combines the set of partial products with the third binary number to produce a redundant Sum and a redundant Carry. Finally, the carry propagate adder adds the redundant Sum and the redundant Carry to yield a Sum Total.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a graphical illustration of the method for implementing the partial product reduction module from FIG. 3, in accordance with a preferred embodiment of the present invention.

DETAILED DESCRIPTION OF A PREFERRED EMBODIMENT

Figure 1:
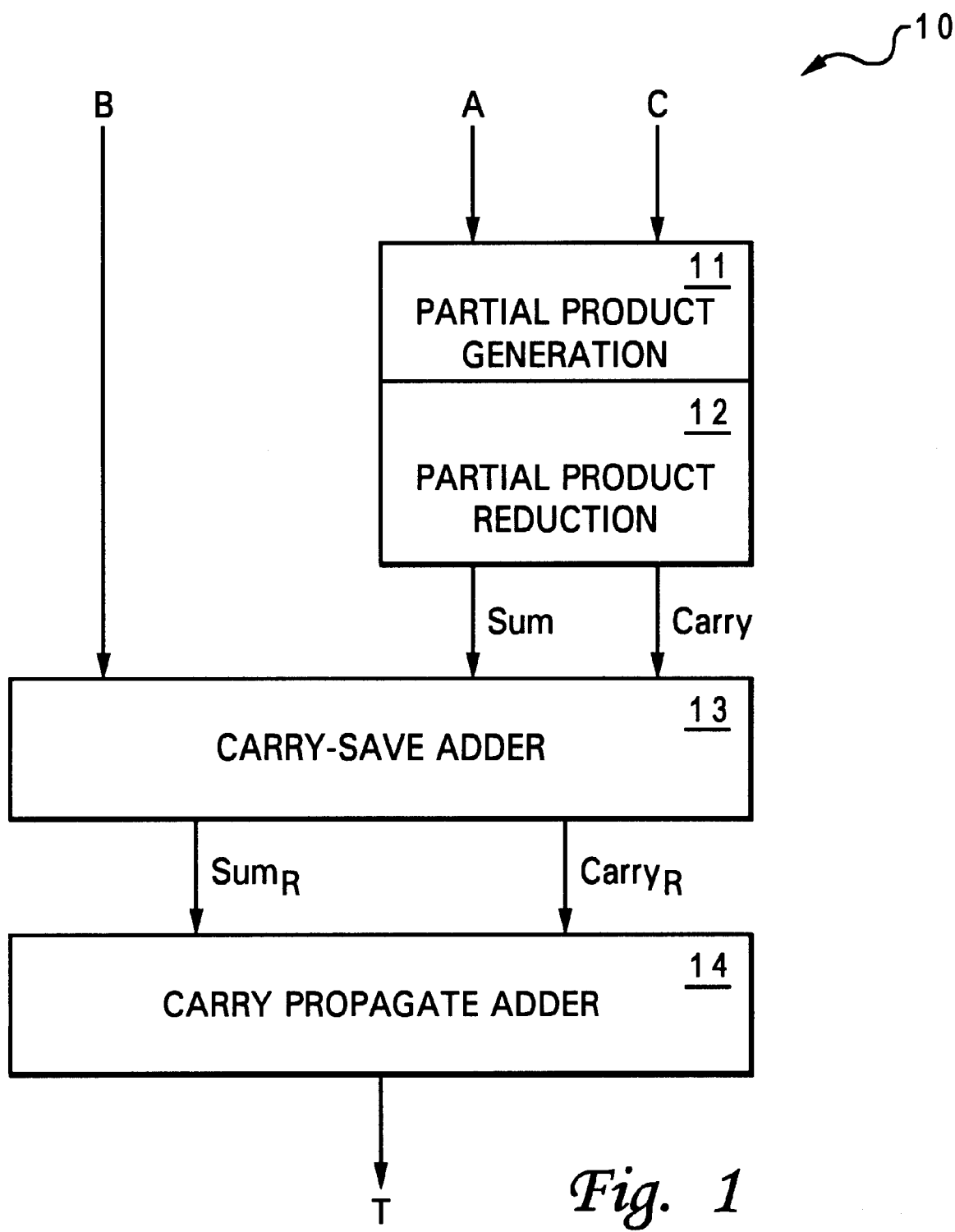
FIG. 1 is a block diagram of a traditional fused multiply-adder.

With reference now to the drawings, and in particular to FIG. 1, there is illustrated a block diagram of a traditional fused multiply-adder. As shown, a fused multiply-adder 10 performs the following function:

$$T = A*C + B$$

A multiplicand A and a multiplier C are initially multiplied via a partial product generation module 11. The partial products from the multiplication are then added via a partial product reduction module 12 that reduces the partial products of A and C to form a set of redundant Sum and redundant Carry. The redundant Sum and redundant Carry are subsequently added to an addend B via a carry-save adder 13 to form a second set of redundant $Sum_R$ and redundant $Carry_R$. The redundant $Sum_R$ and redundant $Carry_R$ are finally added in a carry-propagate adder 14 to yield a sum total T.

Figure 2:
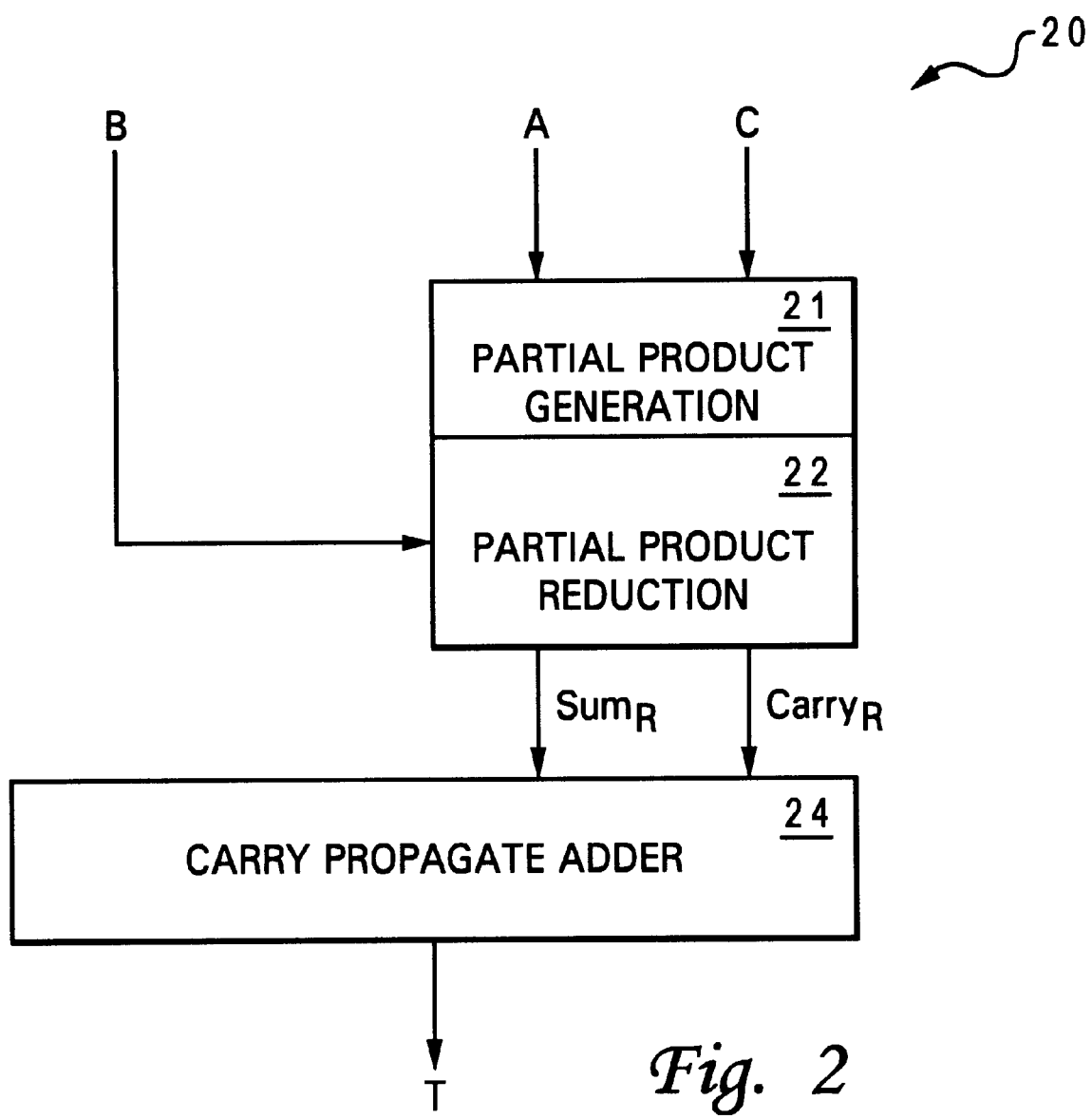
FIG. 2 is a block diagram of a fused multiply-adder in accordance with a preferred embodiment of the present invention.

With reference now to FIG. 2, there is depicted a block diagram of a fused multiply-adder 20 in accordance with a preferred embodiment of the present invention. As shown, a multiplicand A and a multiplier C are initially multiplied via a partial product generation module 21. The partial products from the multiplication are then added via a partial product reduction module 22; and at the same time, an addend B is directly introduced into partial product reduction module 22 for the purpose of addition. The result of the partial product reduction module 22 is a redundant form of the final sum total, i.e., a $Sum_R$ and a $Carry_R$, which are subsequently added by a carry-propagate adder 24 to yield a sum total T.

When comparing fused multiply-adder 20 with fused multiply-adder 10 from FIG. 1, it is quite apparent that carry-save adder 13 in FIG. 1 for performing the function:

$$(Sum_R, Carry_R) = (Sum, Carry) + B$$

has been eliminated from fused multiply-adder 20. Because one logic level is saved, fused multiply-adder 20 allows a fused multiply-add operation to be performed in the same amount of time as a simple multiplication operation.

Figure 3:
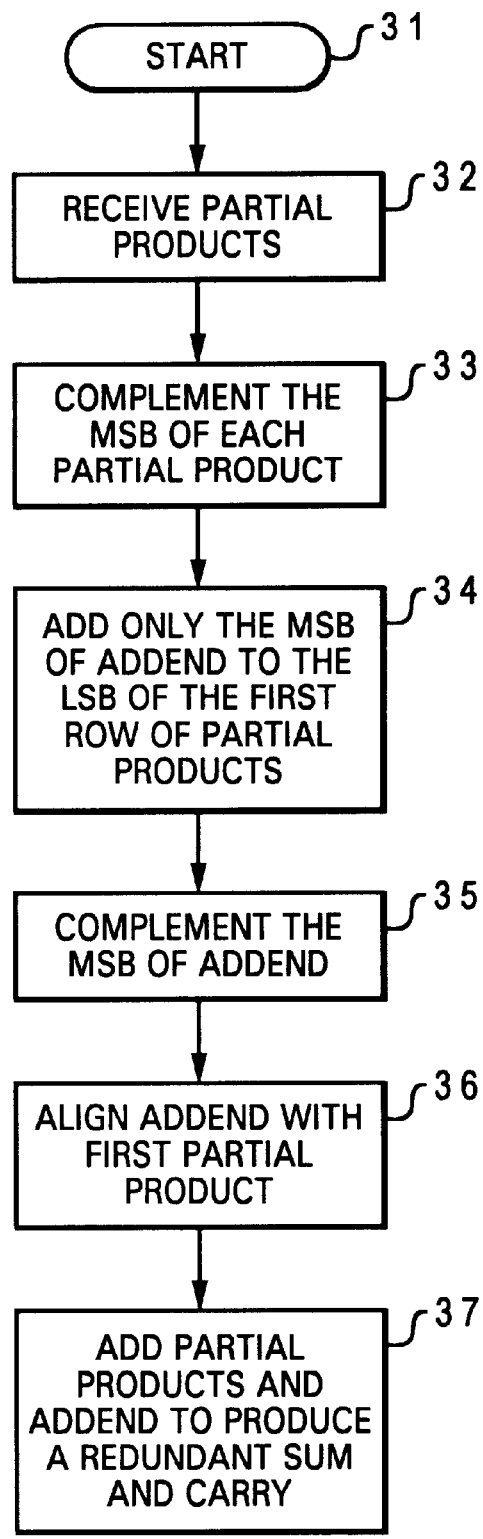
FIG. 3 is a high-level logic flow diagram of a method for implementing a partial product reduction module within the fused multiply-adder from FIG. 2, in accordance with a preferred embodiment of the present invention.

Referring now to FIG. 3, there is illustrated a high-level logic flow diagram of a method for implementing partial product reduction module 22 from FIG. 2, in accordance with a preferred embodiment of the present invention. Starting at block 31, a set of partial products is received from partial product generation module 21 (in FIG. 2), as shown in block 32. The number of partial products is typically the same number as the number of bits in the multiplier. The most significant bit of each partial product is then boolean complemented, as depicted in block 33. Subsequently, only the most significant bit of the addend is added to the least significant bit of the first partial product, as illustrated in block 34. The most significant bit of the addend is also boolean complemented, as illustrated in block 35.

In signed two's complement arithmetic, a multiply-add operation requires that an addend be complemented in an effective subtract. An effective subtract is either a multiply-add operation in which the boolean XOR of the signs of a multiplicand, a multiplier, and an addend is a logical one or a multiply-subtract operation in which the boolean XOR of the signs is a logical zero, where a negative operand has a sign of one and a positive operand has a sign of zero. The signed two's complementation process also requires the introduction of the sign bit of the addend in the partial product reduction module.

The least significant bit of the addend is then aligned with the least significant bit of the first partial product, as shown in block 36. Finally, the addend and all the partial products are added to produce a redundant sum and a redundant carry, as depicted in block 37.

With reference now to FIGS. 4a–4c, there are depicted a graphic illustration of a method for implementing a partial product reduction module, in accordance with a preferred embodiment of the present invention. For the purpose of illustration, three signed five-bit two's complement binary numbers are utilized. In FIG. 4a, a set of partial products is obtained by the multiplication of binary numbers $a_i$ and $c_i$ via a partial product generation module such a partial product generation module 21 from FIG. 2. This set of partial products contains five rows of partial products, with the topmost row being the first partial product and the bottom row being the fifth partial product.

In FIG. 4b, the most significant bit of each partial product is boolean complemented. In FIG. 4c, the most significant bit of the addend is added to the least significant bit of the first partial product; also, the addend, having the most significant bit boolean complemented, is added to the set of partial products, with the least significant bit of the addend aligned with the least significant bit of the first partial product. Finally, all the bits are added to produce a redundant Sum and a redundant Carry to produce a sum total.

Figure 5:
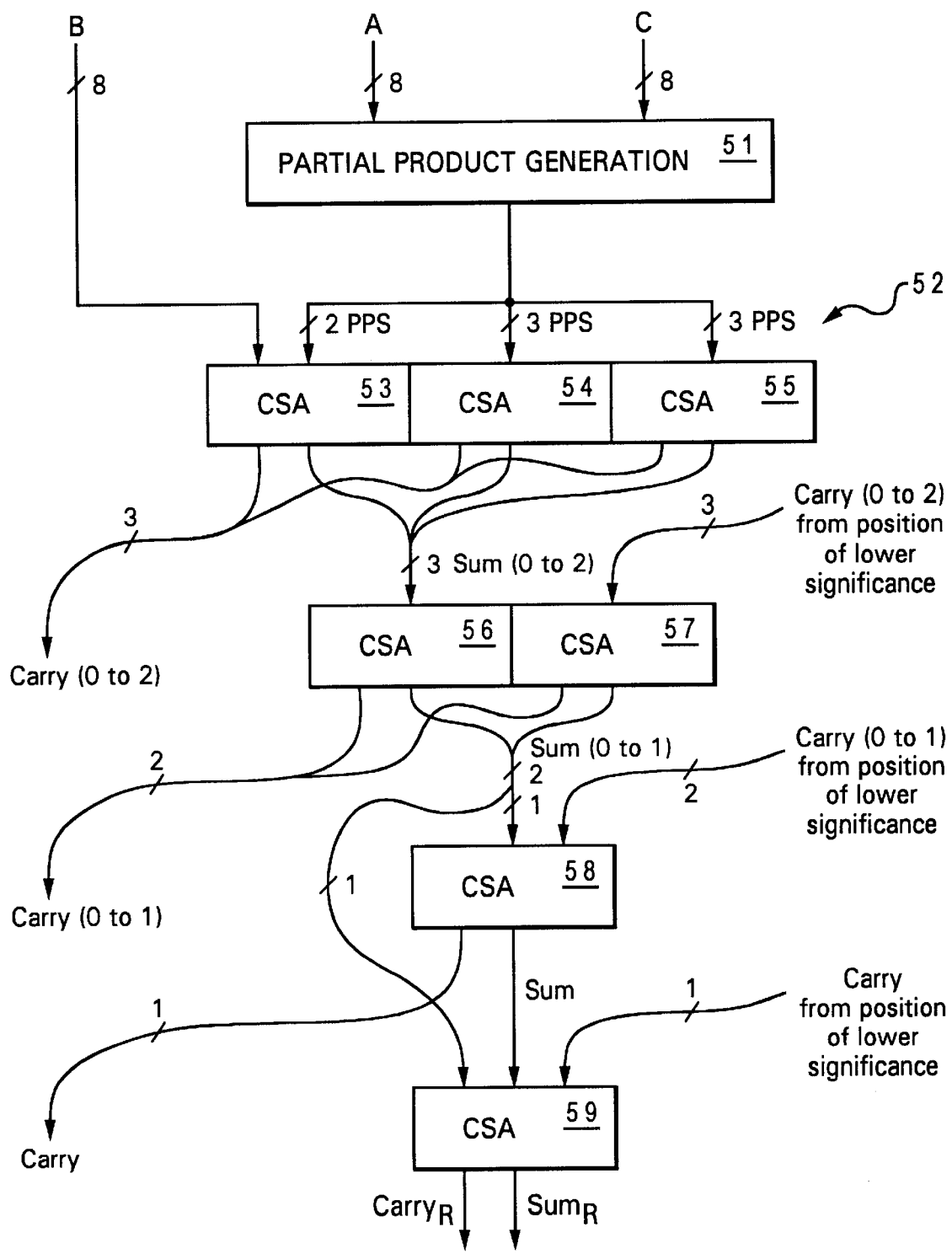
FIG. 5 is a block diagram of an exemplary implementation of an 8-bit partial product reduction module, in accordance with a preferred embodiment of the present invention.

Referring now to FIG. 5, there is illustrated a block diagram of an exemplary implementation of an 8-bit partial product reduction module, in accordance with a preferred embodiment of the present invention. As shown, one column of a partial product reduction module 52 includes seven carry-save adders, i.e., carry-save adders 53–59. Partial products are provided via a partial product generation module 51 by multiplying two 8-bit binary numbers A and C. Because each of the binary numbers A and C is eight bits long, eight partial products will be produced from the multiply operation. Bits from the first two of the eight partial products are sent to carry-save adder 53, those from the next three of the eight partial products are sent to carry-save adder 54, and those from the last three of the eight partial products are sent to carry-save adder 55. The addend, B, is sent to the open position in carry-save adder 53. Each of carry-sum adders 53–55 produces a Sum and a Carry. The Sums from carry-save adders 53–55 are sent to carry-save adder 56, and the Carrys from carry-save adders 53–55 are sent to another set of carry-sum adders (not shown) which are contained in the column of the partial product reduction module 52 which is of immediately greater significance. Similarly, Carrys coming from bit positions of immediately lower significance are supplied to carry-save adder 57. Subsequently, the Sums from carry-save adders 56–57 are sent to carry-save adder 58, and the Carrys from carry-save adders 56–57 are sent to another set of carry-sum adders (not shown) that are centered in the column of the partial product reduction module 52 which is of immediately greater significance. Similarly, Carrys coming from bit positions of immediately lower significance are supplied to carry-save adder 58. Finally, carry-save adder 59 produces a redundant Sum and a redundant Carry to be added by a carry propagate adder such as carry propagate adder 34 in FIG. 2.

It is understood by those skilled in the art that the fused multiply-adder as described may be applicable in a variety of processing devices. These processing devices include but are not limited to complex instruction set computing (CISC) processors and reduced instruction set computing (RISC) processors. Such processors typically comprise at least one processing unit, one or more cache memories associated with each processing unit, and various control logic circuits as are well-known in the art.

As has been described, the present invention provides a low latency fused multiply-adder. The present invention is accomplished by merging an addend into a partial product reduction module in which two's complementation and sign extension for supporting signed multiply-add operation is performed.

With the present invention, the fused multiply-adder is implemented without any additional carry-save adder that is typically required to merge the addend. This invention is particularly advantageous in fused multiplier-adders which have eight or ten or more rows of partial products. For these multiply-adders, the fused multiply-add operation can be performed in the same time in which a simple multiply can be performed.

While the invention has been particularly shown and described with reference to a preferred embodiment, it will be understood by those skilled in the art that various changes in form and detail may be made therein without departing from the spirit and scope of the invention.

What is claimed is:

1. A fused multiply-adder for adding a product of a first binary number and a second binary number to a third binary number, comprising:

a partial product generation module for generating a set of partial products of said first binary number and said second binary number;

a partial product reduction module, connected to said partial product generation module, for combining said set of partial products with said third binary number to produce a redundant Sum and a redundant Carry, wherein said partial product reduction module includes means for complementing a most significant bit of each of said plurality of partial products;

means for complementing a most significant bit of said third binary number;

means for adding said set of partial products with complemented most significant bits, said third binary number with complemented most significant bit, and a most significant bit of said third binary number to produce said redundant Sum and said redundant Carry; and an adder for adding said redundant Sum and said redundant Carry to yield a Sum Total.

2. The fused multiply-adder according to claim 1, wherein said adder is a carry propagate adder.

3. The fused multiply-adder according to claim 1, wherein said partial product reduction module includes a plurality of carry-sum adders.

4. The fused multiply-adder according to claim 1, wherein said partial product reduction module further includes means for aligning a least significant bit of said third binary number with a least significant bit of a first one of said partial products.

5. The fused multiply-adder according to claim 1, wherein said partial product reduction module further includes means for aligning said most significant bit of said third binary number with said least significant bit of said first one of said partial products.

6. A processing device comprising:
  a fused multiply-adder for adding a product of a first binary number and a second binary number to a third binary number, wherein said fused multiply-adder includes:
    a partial product generation module for generating a set of partial products of said first binary number and said second binary number;
    a partial product reduction module, connected to said partial product generation module, for combining said set of partial products with said third binary number to produce a redundant Sum and a redundant Carry, wherein said partial product reduction module includes
      means for complementing a most significant bit of each of said plurality of partial products;
      means for complementing a most significant bit of said third binary number;
      means for adding said set of partial products with complemented most significant bits, said third binary number with complemented most significant bit, and a most significant bit of said third binary number to produce said redundant Sum and said redundant Carry; and
    an adder for adding said redundant Sum and said redundant Carry to yield a Sum Total.

7. The processing device according to claim 6, wherein said adder is a carry propagate adder.

8. The processing device according to claim 6, wherein said partial product reduction module includes a plurality of carry-sum adders.

9. The processing device according to claim 6, wherein said partial product reduction module further includes
  means for aligning a least significant bit of said third binary number with a least significant bit of a first one of said partial products.

10. The processing device according to claim 6, wherein said partial product reduction module further includes means for aligning said most significant bit of said third binary number with said least significant bit of said first one of said partial products.

11. A method for adding a product of a first binary number and a second binary number to a third binary number, said method comprising the steps of:
  generating a set of partial products of said first binary number and said second binary number;
  combining said set of partial products with said third binary number to produce a redundant Sum and a redundant Carry by,
    complementing a most significant bit of each of said plurality of partial products;
    complementing a most significant bit of said third binary number;
    adding said set of partial products with complemented most significant bits, said third binary number with complemented most significant bit, and a most significant bit of said third binary number to produce said redundant Sum and said redundant Carry; and
  adding said redundant Sum and said redundant Carry to yield a Sum Total.

12. The method according to claim 11, wherein said adding step is performing with a carry propagate adder.

13. The method according to claim 11, wherein said combining step is performed with a plurality of carry-sum adders.

14. The method according to claim 11, wherein said combining step further includes
  aligning a least significant bit of said third binary number with a least significant bit of a first one of said partial products.

15. The method according to claim 11, wherein said combining step further includes a step of aligning said most significant bit of said third binary number with said least significant bit of said first one of said partial products.

* * * * *